(12) United States Patent
Joodaki et al.

(10) Patent No.: US 10,719,998 B2
(45) Date of Patent: **\*Jul. 21, 2020**

(54) VEHICLE ACCIDENT REPORTING SYSTEM

(71) Applicant: INTERNATIONAL BUSINESS MACHINES CORPORATION, Armonk, NY (US)

(72) Inventors: Saeideh Joodaki, Atlanta, GA (US); William P. Shaouy, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/823,425

(22) Filed: Nov. 27, 2017

(65) Prior Publication Data

US 2018/0082500 A1   Mar. 22, 2018

Related U.S. Application Data

(63) Continuation of application No. 15/156,420, filed on May 17, 2016, now Pat. No. 9,922,471.

(51) Int. Cl.
*G07C 5/08* (2006.01)
*B60R 1/00* (2006.01)
(Continued)

(52) U.S. Cl.
CPC .......... *G07C 5/0841* (2013.01); *B60W 40/10* (2013.01); *G06K 9/22* (2013.01); *G06K 9/3258* (2013.01);
(Continued)

(58) Field of Classification Search
CPC ...... G07C 5/0841; G07C 5/008; G06Q 40/08; B60W 40/10
See application file for complete search history.

(56) References Cited

U.S. PATENT DOCUMENTS 5,461,566 A   10/1995   Musser
6,141,611 A   10/2000   Mackey et al.
(Continued)

FOREIGN PATENT DOCUMENTS

EP   2743871 A1   6/2014

OTHER PUBLICATIONS

Sontakke et al., "Crash Notification System for Portable Devices," International Journal of Advanced Computer Technology, ISSN: 2319-7900, vol. 2, No. 3, pp. 33-38.
(Continued)

*Primary Examiner* — Hunter B Lonsberry
*Assistant Examiner* — Mathew Franklin Gordon
(74) *Attorney, Agent, or Firm* — Stephen R. Yoder

(57) ABSTRACT

A vehicle accident reporting system and method identifies, using a sudden event detection processor operatively coupled to non-transient storage and an accelerometer in a vehicle, a sudden event when a measured acceleration of the vehicle sensed by the accelerometer exceeds either a predefined maximum acceleration or a predefined maximum deceleration indicative of an accident. A notification is transmitted, using the sudden event detection processor, over a network to an accident management hub that a sudden event has occurred. A prompt is transmitted over the network to a mobile device associated with an owner or operator of the vehicle, the prompt requesting that the owner or operator photograph a license plate of any other vehicle involved in the accident and record video of the accident scene. The requested image of the license plate and video of the accident scene is receiving from the mobile device.

20 Claims, 12 Drawing Sheets

(51) Int. Cl.

| | | |
|---|---|---|
| *B60R 21/0132* | (2006.01) | |
| *B60W 40/10* | (2012.01) | |
| *G06Q 40/08* | (2012.01) | |
| *G07C 5/00* | (2006.01) | |
| *B60R 21/00* | (2006.01) | |
| *B60R 21/01* | (2006.01) | |
| *G06K 9/22* | (2006.01) | |
| *G06K 9/32* | (2006.01) | |

(52) U.S. Cl.
CPC ............ *G06Q 40/08* (2013.01); *G07C 5/008* (2013.01); *G07C 5/0866* (2013.01); *G06K 2209/15* (2013.01)

(56) References Cited

U.S. PATENT DOCUMENTS

| | | | |
|---|---|---|---|
| 7,327,238 | B2 | 2/2008 | Bhogal et al. |
| 7,446,649 | B2 | 11/2008 | Bhogal et al. |
| 7,486,176 | B2 | 2/2009 | Bhogal et al. |
| 7,527,288 | B2 | 5/2009 | Breed |
| 8,700,255 | B2 | 4/2014 | Joseph |
| 8,836,784 | B2 | 9/2014 | Erhardt et al. |
| 8,983,649 | B2 | 3/2015 | Checketts et al. |
| 9,296,396 | B2 | 3/2016 | Gluck et al. |
| 9,619,107 | B2 | 4/2017 | Wang et al. |
| 9,767,625 | B1 | 9/2017 | Snyder et al. |
| 9,779,318 | B1 | 10/2017 | Wilbert et al. |
| 9,922,471 | B2 * | 3/2018 | Joodaki ................ G07C 5/0841 |
| 2003/0028298 | A1 | 2/2003 | Macky et al. |
| 2007/0100521 | A1 | 5/2007 | Grae |
| 2010/0161491 | A1 | 6/2010 | Bauchot et al. |
| 2011/0285574 | A1 | 11/2011 | Tsunekawa |
| 2012/0116819 | A1 | 5/2012 | Hertenstein |
| 2012/0143630 | A1 | 6/2012 | Hertenstein |
| 2013/0069802 | A1 | 3/2013 | Foghel et al. |
| 2014/0114691 | A1 | 4/2014 | Pearce |
| 2014/0297058 | A1 | 10/2014 | Barker et al. |
| 2015/0084757 | A1 | 3/2015 | Annibale et al. |
| 2015/0146004 | A1 | 5/2015 | Kritt et al. |
| 2015/0187017 | A1 | 7/2015 | Weiss |
| 2015/0287182 | A1 | 10/2015 | Herger et al. |
| 2015/0373308 | A1 | 12/2015 | Chen |
| 2016/0035037 | A1 | 2/2016 | Bulan et al. |
| 2017/0076396 | A1 | 3/2017 | Sudak |

OTHER PUBLICATIONS

White et al., "WreckWatch: Automatic Traffic Accident Detection and Notification with Smartphones," Journal of Mobile Networks and Applications Manuscript, pp. 1-28.

* cited by examiner

VEHICLE ACCIDENT REPORTING SYSTEM

This application is a continuation of U.S. patent application Ser. No. 15/156,420 (filed May 17, 2016), the entirety of which is incorporated herein by reference.

BACKGROUND

This disclosure relates to data communication, and more specifically, to a computer-implemented system and method for determining that a vehicle has been involved in an accident, collecting data relating to the accident, and reporting the accident to emergency services and insurance providers.

Vehicular accidents today are typically handled in the following manner. When an accident occurs, the driver, occupant or other person will contact emergency services if medical attention is required and report the accident to law enforcement, who will prepare an accident report regarding the circumstances of the accident based on observing the scene of the accident and interviewing the drivers involved and any witnesses. In addition, the driver or owner of the vehicle involved in the accident will typically report the accident to its insurance provider, who may take a statement regarding the accident and attempt to determine the responsible party.

SUMMARY

In one aspect of this disclosure, a vehicle accident reporting system includes an accident management hub and a sudden event detection processor operatively coupled to non-transient storage and at least one accelerometer in a vehicle. A sudden event is detected by the sudden event detection processor when a measured acceleration of the vehicle sensed by the at least one accelerometer exceeds either a predefined maximum acceleration or a predefined maximum deceleration. A notification is transmitted over a network to the accident management hub that a sudden event has occurred. A prompt is transmitted by the accident management hub over a network to a mobile device associated with an owner or operator of the vehicle, the prompt requesting that the owner or operator photograph a license plate of any other vehicle involved in the accident and record video of the accident scene. The accident management hub receives from the mobile device the requested image of the license plate and video of the accident scene.

In another aspect of this disclosure, a computer implemented vehicle accident reporting method identifies, using a sudden event detection processor operatively coupled to non-transient storage and an accelerometer in a vehicle, a sudden event when a measured acceleration of the vehicle sensed by the accelerometer exceeds either a predefined maximum acceleration or a predefined maximum deceleration indicative of an accident. A notification is transmitted, using the sudden event detection processor, over a network to an accident management hub that a sudden event has occurred. A prompt is transmitted over the network to a mobile device associated with an owner or operator of the vehicle, the prompt requesting that the owner or operator photograph a license plate of any other vehicle involved in the accident and record video of the accident scene. The requested image of the license plate and video of the accident scene is receiving from the mobile device.

DETAILED DESCRIPTION

The following detailed description refers to the accompanying drawings. The same labels and/or reference numbers in different drawings may identify the same or similar elements.

A representative vehicle accident reporting system and computer-implemented methods are disclosed for determining that a vehicle has been involved in an accident, collecting data relating to the accident, and reporting the accident to emergency services and insurance providers. In the context of this disclosure, the term "vehicle" refers to any mechanism suitable to transport people or goods, such as (but not limited to) any automobile, motorcycle, bus, truck, train, or the like. It is understood that the term "vehicle" is not limited to motorized or electric powered vehicles and may encompass (but is not limited to) bicycles, tricycles, boats, canoes, kayaks, aircraft including gliders, and the like.

Figure 1:
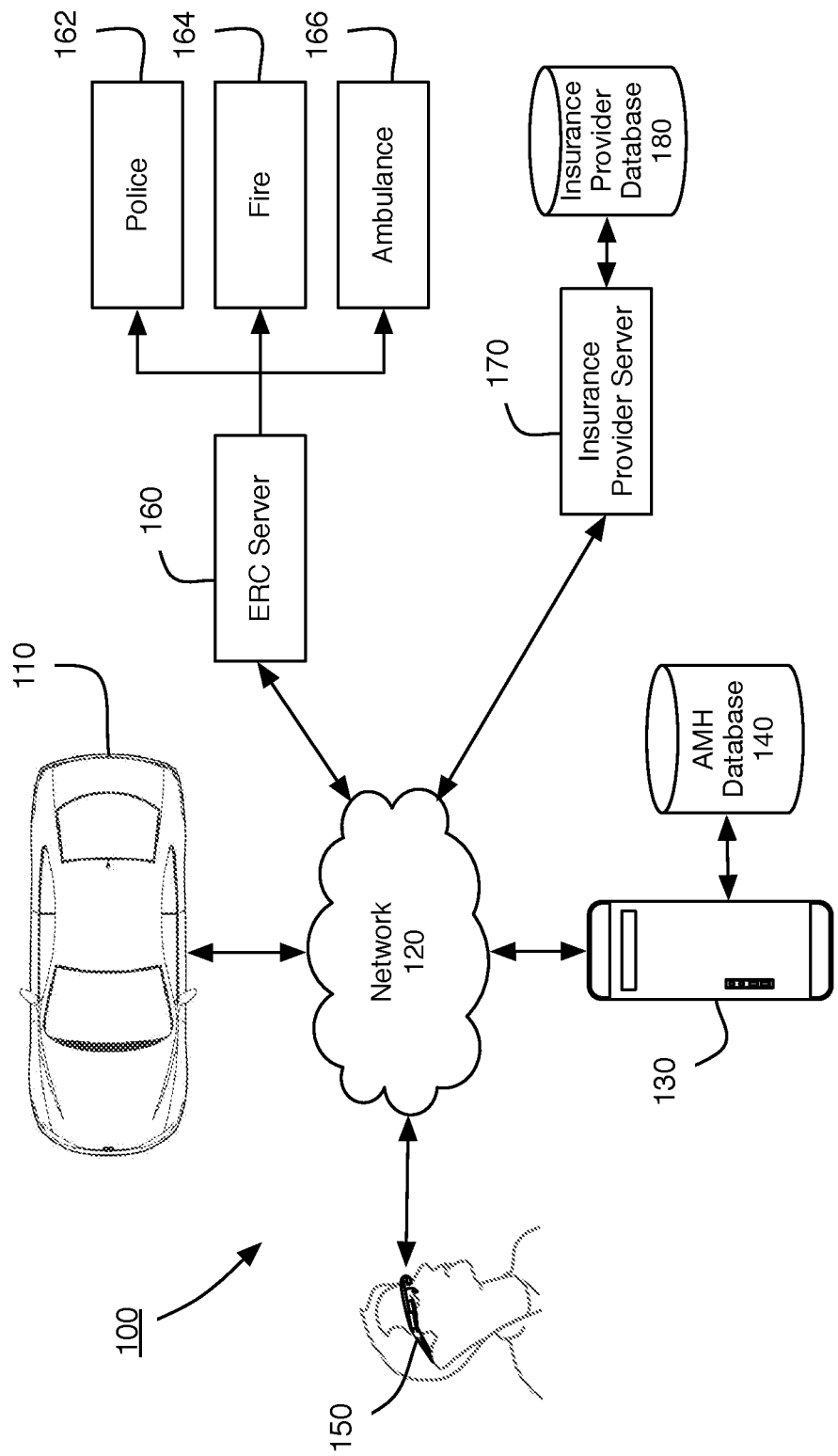
FIG. 1 is an illustrative network environment in which an accident management hub may be implemented.

FIG. 1 is an illustrative network environment 100 in which an accident management hub (AMH) 130 may be implemented. The network environment 100 may include one or more vehicles 110 having at least one vehicle sudden event detection processor or CPU (300 in FIG. 3) that communicates wirelessly over one or more networks 120 with the AMH 130. As will be discussed in greater detail below with respect to FIG. 3, the vehicle(s) 110 include sensors, video cameras, etc. that collect and store data just prior to the occurrence of an accident, which data is transmitted to the AMH 130 over network 120. The data may be stored in one or more databases 140 operatively connected to the AMH 130. Network 120 may be a wide area network (WAN) such as the Internet, the Public Switched Telephone Network (PSTN), a local area network (LAN), an intranet, an extranet, a cellular network, any wired or wireless network, or any combination of the above that will support wireless communication between the AMH 130 and the vehicle 110.

The AMH 130 can also communicate with one or more mobile devices 150 over network 120. As will be discussed below, the mobile device 150 may be used by an insured or operator of a vehicle 110 involved in an accident to record and/or collect data (e.g., video, photographs, etc.) or other information relating to the accident. The mobile device 150 is preferably a wearable electronic/computing device, such as (but not limited to) wearable electronic/computing devices affixed to eyeglasses and sunglasses (e.g., Google Glass®), helmets, wristwatches, and the like, that are capable of recording/collecting data and communicating with AMH 130 via network 120. Alternatively, the mobile device 150 may be a smart phone (e.g., iPhone® or Android® handheld device); tablet computer (e.g., iPad® or Windows® Surface® tablet computer); personal digital assistant (PDA); or any other electronic device or computing system capable of communicating with AMH 130 via network 120.

The AMH 130 can also communicate with one or more Emergency Response Center (ERC) or 911 Dispatch Center servers 160 over network 120. As is known in the art, the ERC server 160 is operatively connected to one or more police department servers 162, fire department servers 164 and ambulance servers 166, such that, in the event of an accident reported by the AMH 130 via network 120, the ERC server 160 can dispatch police and, if necessary, fire and/or ambulance personnel to the location of the accident.

Similarly, AMH 130 can communicate with one or more insurance provider servers 170 over network 120 to report an accident by an insured of the insurance provider and to provide data collected by the vehicle(s) 110 involved in the accident that was transmitted to the AMH 130. In addition, the AMH 130 and/or the insurance provider server 170 may optionally be able to communicate over network 120 with the mobile device 150 to, among other things, instruct the user of mobile device 150 as to the information relating to the accident that the user should record and/or collect using the mobile device 150.

Figure 2:
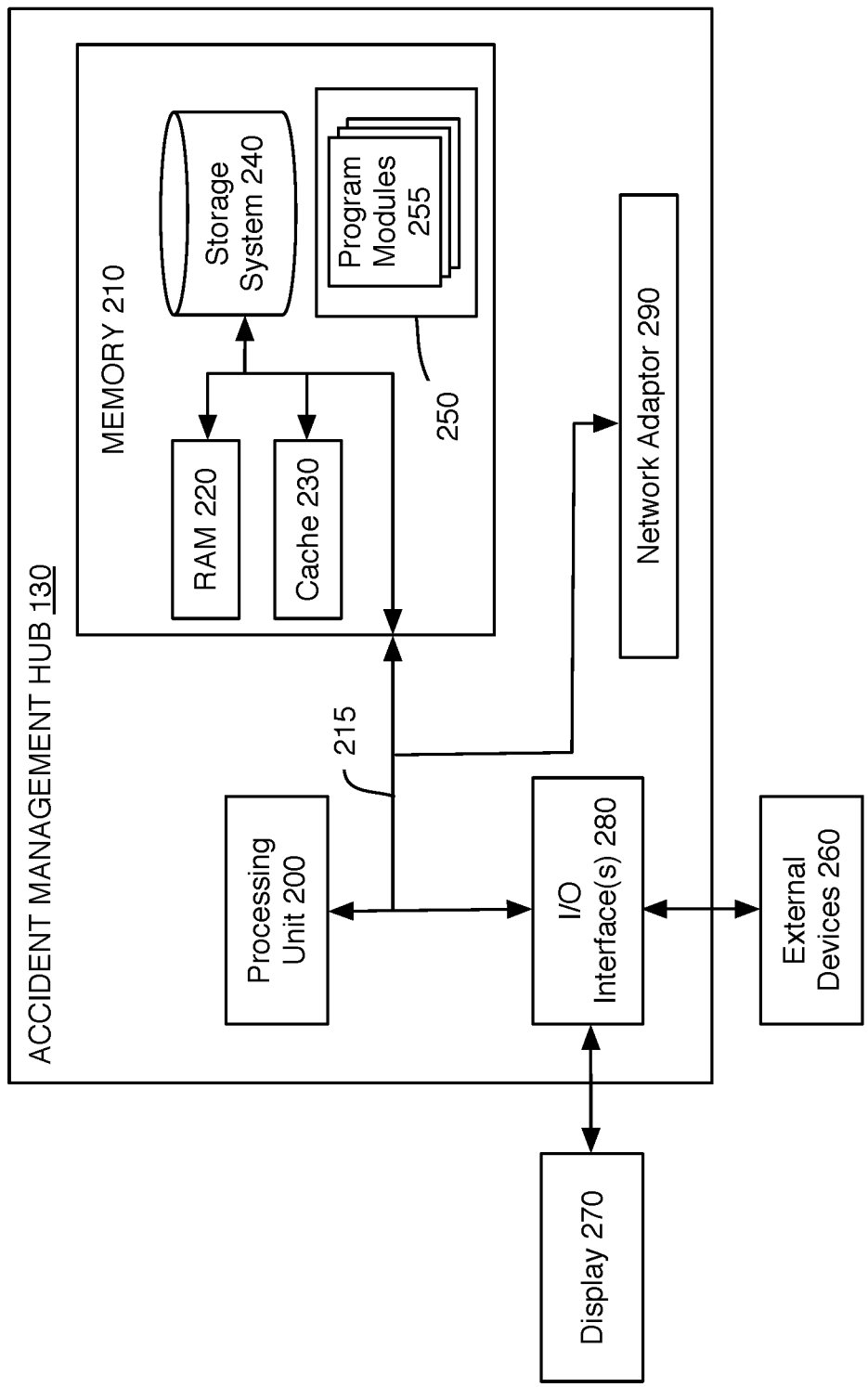
FIG. 2 is a block diagram of an illustrative accident management hub that may be utilized to implement the various features and processes described herein.

Referring to FIG. 2, AMH 130 may be operational with numerous other general purpose or special purpose computing systems, environments or configurations. Examples of well-known computing systems, environments and/or configurations that may be suitable for use with AMH 130 include (but are not limited to) server computer systems, personal computer systems, thin clients, thick clients, handheld or laptop devices, multiprocessor systems, microprocessor-based systems, mainframe computer systems, and distributed cloud computing environments that include any of the above systems or devices, and the like.

AMH 130 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, AMH 130 is illustrated in the form of a special purpose computer system. The components of AMH 130 may include (but are not limited to) one or more processors or processing units 200, a system memory 210, and a bus 215 that couples various system components including memory 210 to processor 200.

Bus 215 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 200 may execute computer programs stored in memory 210. Any suitable programming language can be used to implement the routines of particular embodiments including C, C++, Java, assembly language, etc. Different programming techniques can be employed such as procedural or object oriented. The routines can execute on a single AMR 130 or multiple AMHs 130. Further, multiple processors 200 may be used.

AMH 130 typically includes a variety of computer system readable media. Such media may be any available media that is accessible by AMH 130, and it includes both volatile and non-volatile media, removable and non-removable media.

System memory 210 can include computer system readable media in the form of volatile memory, such as random access memory (RAM) 220 and/or cache memory 230. AMH 130 may further include other removable/non-removable, volatile/non-volatile computer system storage media. By way of example only, storage system 240 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 215 by one or more data media interfaces. As will be further depicted and described below, memory 210 may include at least one program product having a set (e.g., at least one) of program modules that are configured to carry out the functions of embodiments described in this disclosure.

Program/utility 250, having a set (at least one) of program modules 255, may be stored in memory 210 by way of example, and not limitation, as well as an operating system, one or more application programs, other program modules, and program data. Each of the operating system, one or more application programs, other program modules, and program data or some combination thereof, may include an implementation of a networking environment.

AMH 130 may also communicate with one or more external devices 260 such as a keyboard, a pointing device, a display 270, etc.; one or more devices that enable a user to interact with AMH 130; and/or any devices (e.g., network card, modem, etc.) that enable AMH 130 to communicate with one or more other computing devices. Such communication can occur via Input/Output (I/O) interface(s) 280.

In addition, as described above, AMH 130 can communicate with one or more networks 120, such as a local area network (LAN), a general wide area network (WAN) and/or a public network (e.g., the Internet) via network adaptor 290. As depicted, network adaptor 290 communicates with other components AMH 130 via bus 215. It should be understood that although not shown, other hardware and/or software components could be used in conjunction with AMH 130. Examples include (but are not limited to) microcode, device drivers, redundant processing units, external disk drive arrays, RAID systems, tape drives, and data archival storage systems, etc.

Figure 3:
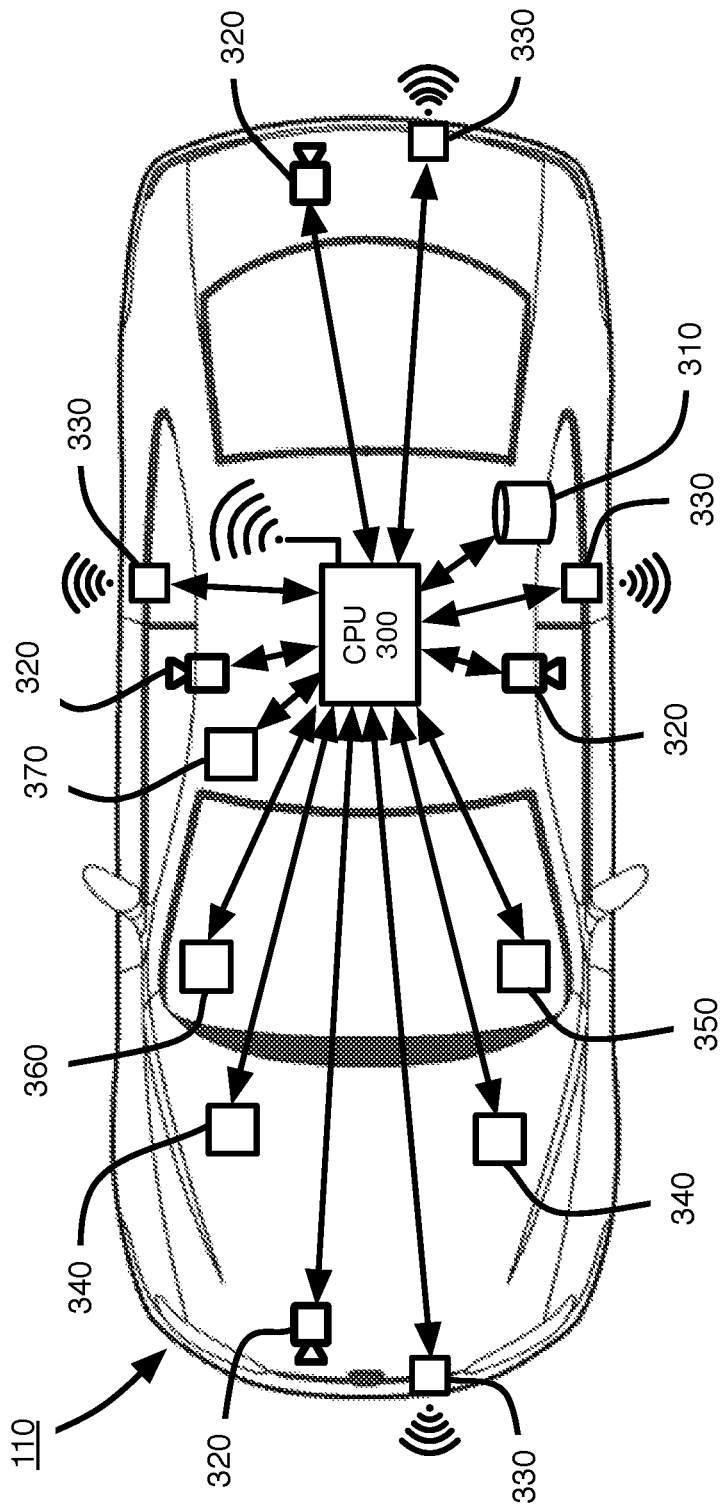
FIG. 3 illustrates, in simplified form, various components in an illustrative vehicle that can communicate over a wireless network with the accident management hub.

FIG. 3 shows, in simplified form, various components in an illustrative vehicle 110 that can communicate wirelessly with the AMH 130 via network 120. Vehicle 110 preferably includes at least one vehicle processing unit or CPU 300 (also referred to herein as a "sudden event detection processor") operationally coupled to memory 310. The vehicle sudden event detection processing unit 300 executes computer programs stored in memory 310, and is preferably operationally coupled to at least one video camera 320, at least one proximity sensor 330, at least one accelerometer 340, a speedometer sensor 350, at least one airbag sensor 360, and a global positioning satellite (GPS) transceiver 370 mounted on vehicle 110.

The vehicle sudden event detection processing unit 300 captures the speed of the vehicle 110 using the speedometer sensor 350. One purpose is to enable the vehicle sudden event detection processing unit 300 to calculate the vehicle's acceleration or deceleration and compare it to that which was reported by the accelerometer 340. As will be explained more fully below, this comparison is used to determine whether the vehicle's accelerometer 340 is functioning properly. The vehicle sudden event detection processing unit 300 also uses the speedometer sensor 350 to collect and store the velocity of the vehicle 110 at time of impact, which may be used as a data point for the insurance provider to analyze the accident.

Figure 4:
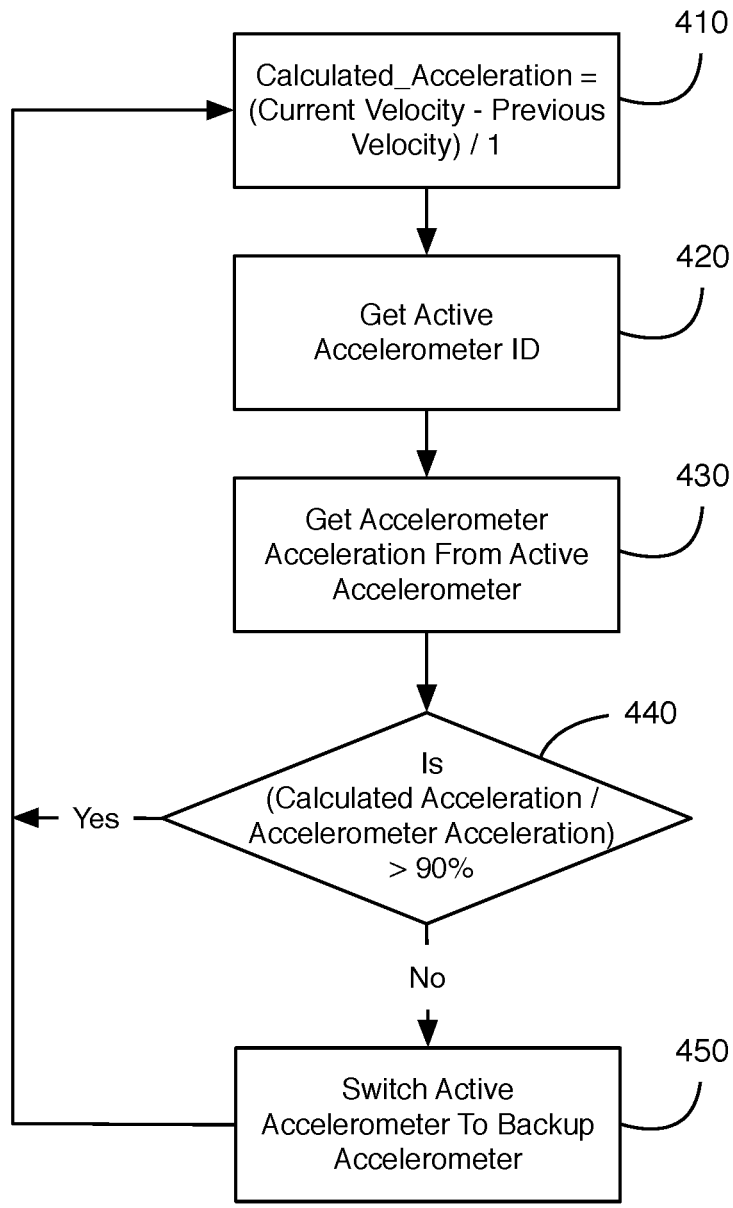
FIG. 4 illustrates a preferred sequence of steps for determining which one of a plurality of accelerometers in vehicle should be the "active" accelerometer.

To reduce the possibility of a false alarm, the vehicle 110 is optionally equipped with two or more accelerometers 340, with one accelerometer being the active accelerometer and the other(s) being used for backup. FIG. 4 illustrates a preferred sequence of steps for determining which accelerometer 340 in vehicle 110 should be used by the vehicle sudden event detection processing unit 300. Once the process is initiated by the processing unit 300, the processing unit 300 calculates the acceleration of the vehicle 110 using velocity measurements received from the vehicle speedometer 350 (Step 410) using the following formula:

$$\text{Calculated\_Acceleration} = (\text{Current\_Velocity} - \text{Previous\_Velocity})/1$$

The vehicle sudden event detection processing unit 300 obtains the ID of one of the accelerometers 340 (Step 420), which is referred to as the "active" accelerometer. The processing unit 300 obtains the measured acceleration from the "active" accelerometer 340 (Step 430) and compares the measured acceleration to the calculated acceleration (Step 440). If the quotient of the calculated acceleration divided by the measured acceleration is greater than a predefined threshold (e.g., 90%), then the process is repeated beginning at Step 410. Alternatively, if the quotient is not greater than the predefined threshold (Step 440), then the processing unit 300 switches one of the backup accelerometers 340 to become the "active" accelerometer, and the process repeats continuously beginning at Step 410.

Figure 5:
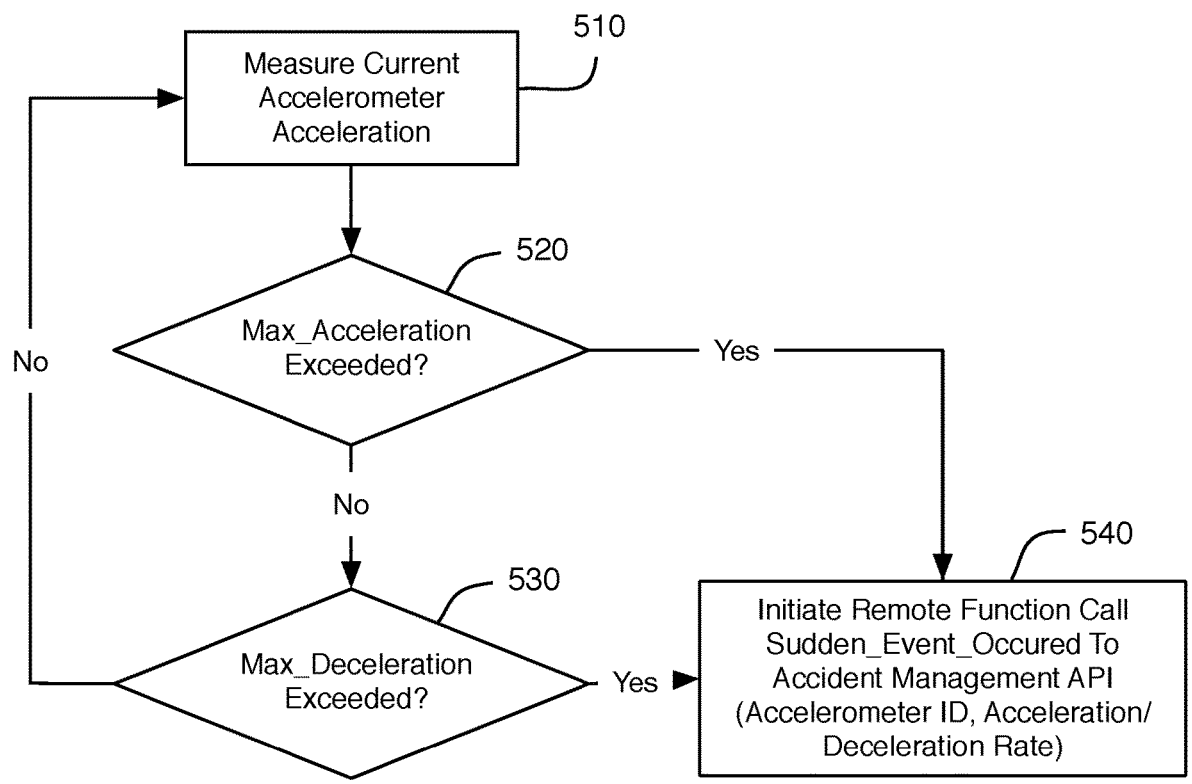
FIG. 5 illustrates a preferred sequence of steps for determining whether a sudden event has occurred that is indicative of a vehicular accident.

Referring to FIG. 5, the active and backup accelerometers 340 may initiate the accident reporting process when that accelerometer experiences an abrupt acceleration or deceleration that is indicative of an accident. That is, each accelerometer 340, preferably enhanced with programming intelligence, continually polls itself to see whether an abrupt acceleration/deceleration occurs that exceeds a pre-defined threshold that is indicative of an auto accident. If so, either the accelerometer 340 or the vehicle sudden event detection processing unit 300 calls the Accident Management API sudden_event_occurred, passing on, inter alia, the accelerometer ID and acceleration/deceleration rate to the AMH 130.

This process is illustrated in FIG. 5. Once initiated, one or more accelerometers 340 measure the current acceleration of the vehicle 110 (Step 510). The measured acceleration is compared to a pre-defined maximum acceleration that is indicative of an auto accident (Step 520). If the predefined maximum acceleration is not exceeded, then the accelerometer 340 compares the measured acceleration to a predefined maximum deceleration that is indicative of an auto accident (Step 530). If neither the predefined maximum acceleration threshold (Step 520) nor the predefined maximum deceleration threshold is exceeded (Step 530), then the process is repeated at Step 510. This is referred to as continuous "polling" of the accelerometer 340.

On the other hand, if either the predefined maximum acceleration threshold or the predefined maximum deceleration threshold is exceeded (Steps 520, 530), then the vehicle accelerometer 340 initiates the accident reporting process (Step 540) by, for example, causing a remote function call to be made from the vehicle 111 to the Accident Management API 255 running on the AMH 130. The remote function call may include (but is not limited to) the accelerometer ID, time of accident when either threshold was exceeded, GPS coordinates at the time of accident (obtained from the GPS transceiver 370 in the vehicle 110), and the measured acceleration/deceleration rate of the vehicle. If the accelerometer 340 has wireless capabilities, then the accelerometer can directly place the remote function call to AMH 130. Alternatively, the vehicle sudden event detection processing unit 300 can place the remote function call to AMH 130. The remote function call may be made using any known protocol, including (but not limited to) HTTP, REST, SOAP, XML-RPC, etc.

As discussed above, the vehicle 110 includes at least one video camera 320 operatively coupled to the vehicle sudden event detection processing unit 300. Preferably, the vehicle 110 includes four video cameras 320, one on the front, rear, driver's side and passenger side of the vehicle 110, to capture the scene of the accident. Each camera 320 is continually capturing video, but the vehicle sudden event detection processing unit 300 is preferably maintaining only a short segment of a predefined duration (e.g., the last ten seconds) of each video stream from each camera 320, in order to maintain disk space while capturing enough accident scene detail to be useful for the insurance provider. When an accident event is detected as described above, the vehicle sudden event detection processing unit 300 will send the most recently stored video segments (e.g., the last-ten-second video segments) from each camera 320 to the AMR 130 for subsequent processing and interpretation by the insurance provider.

Figure 6:
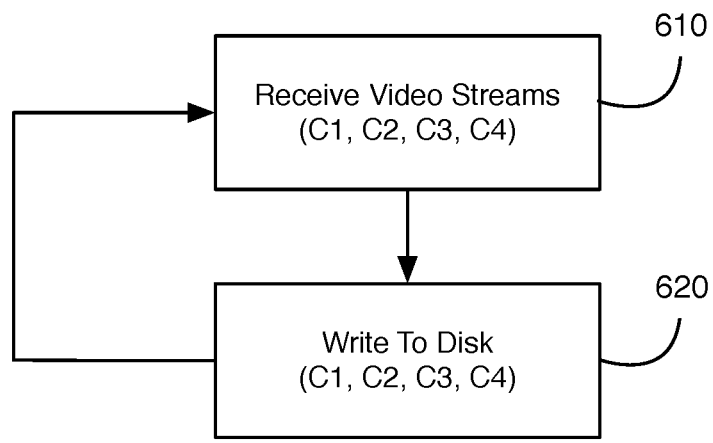
FIG. 6 illustrates a preferred sequence of steps for storing video inputs from cameras on the vehicle.
Figure 7:
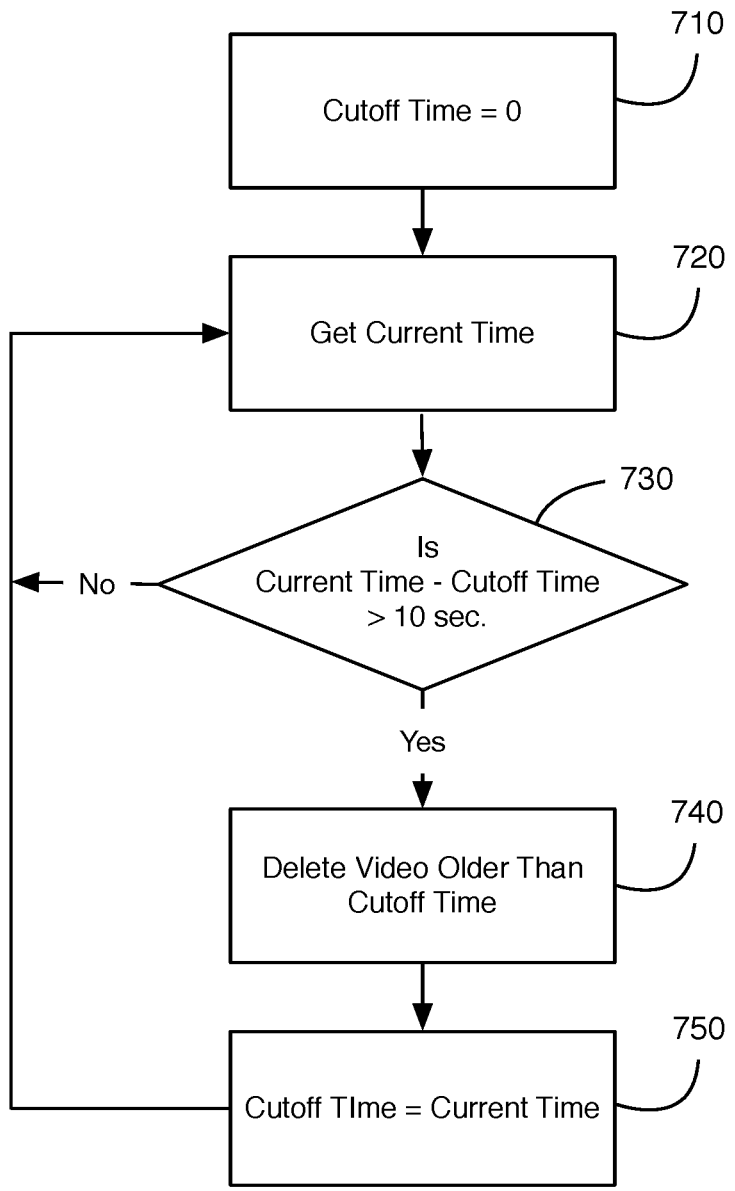
FIG. 7 is a continued preferred sequence of steps from FIG. 6.

FIGS. 6 and 7 illustrate a preferred sequence of steps for how the vehicle processing unit 300 processes the video inputs from cameras 320. Preferably, the vehicle processing unit 300 runs two concurrent processes. Referring to FIG. 6, the first process is preferably an infinite loop where the vehicle sudden event detection processing unit 300 receives video streams C1, C2, C3 and C4 captured from their respective cameras 320 (Step 610). The processing unit 300 then stores the video streams in memory 310 (e.g., writes to disk) (Step 620).

Referring to FIG. 7, the second process is also an infinite loop that manages storage (e.g., disk space) in memory 310. Once initiated, the vehicle sudden event detection processing unit 300 initially sets the Cutoff Time to "0" (Step 710) and obtains the Current Time (Step 720). The processing unit 300 then determines if the last cutoff time was more than the predefined duration (e.g., 10 seconds) of segments to be stored. While the predefined duration of segments to be stored is 10 seconds in the example illustrated in FIG. 7, it is understood that the predefined duration of segments to be stored is not limited to 10 seconds and other desired durations may be set as the predefined duration. This is accomplished by the processing unit 300 calculating the difference between the Current Time and the Cutoff Time (Step 730). If the difference is less than the predefined duration (e.g., 10 seconds), then the processing unit 300 loops back to Step 720 and obtains an updated Current Time and calculates the difference between the updated Current Time and the Cutoff Time (Step 730). Steps 720 and 730 will continue in a loop until the difference between the Current Time and Cutoff Time exceeds the predefined duration (e.g., 10 seconds) (Step 730).

Once the processing unit 300 determines that the difference between the Current Time and Cutoff Time exceeds the predefined duration (e.g., 10 seconds) (Step 730), the processing unit 300 deletes the video segments C1, C2, C3, C4 stored in memory 310 (Step 620 in FIG. 6) that are older than the Cutoff Time (Step 740) and resets the Cutoff Time to the Current Time (Step 750. This way, the last 10 seconds (or other predefined duration) of video from each of the cameras 320, and not more, is continually maintained in memory 310.

As discussed above, the vehicle 110 includes at least one proximity sensor 330 operatively coupled to the vehicle sudden event detection processing unit 300. Preferably, the vehicle 110 includes four proximity sensors 330, one on the front, rear, driver's side and passenger side of the vehicle 110, to capture proximity data within a predefined period prior to the accident. Similar to the predefined duration of video stored in memory, the vehicle sudden event detection processing unit 300 only maintains proximity data in memory 310 for predefined periods (e.g., the last 10 seconds).

Figure 8:
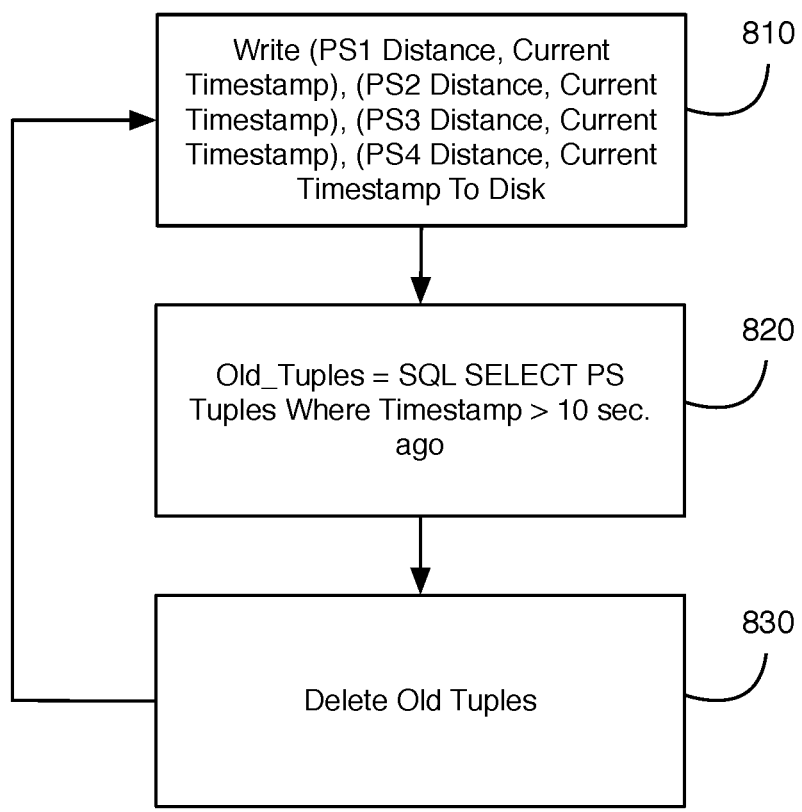
FIG. 8 illustrates a preferred sequence of steps for storing proximity data from proximity sensors on the vehicle.

The storing of proximity data in memory 310 is illustrated in FIG. 8. The preferred process is an infinite loop in which the vehicle sudden event detection processing unit 300 writes a tuple (i.e., a paired list) of proximity data from each of the proximity sensors 330 to memory 310 (Step 810). Each tuple preferably includes the distance recorded from its proximity sensor, and the current timestamp. The vehicle sudden event detection processing unit 300 next performs a SQL SELECT operation to retrieve all tuples that are older than the predefined duration (e.g., 10 seconds) (Step 820) and, using the timestamps of each tuple, the vehicle processing unit 300 deletes the retrieved old tuples from the memory 310 (Step 830). This process continues as an infinite loop. As will be discussed further below, upon detecting an accident, the vehicle sudden event detection processing unit 300 will send the last predefined duration (e.g., 10 seconds) of tuples stored in memory 310 to the AMR 130.

As discussed above, the vehicle 110 includes at least one airbag sensor 360 operatively coupled to the vehicle sudden event detection processing unit 300. The airbag sensor(s) 360 preferably monitor the state of the airbag(s) within vehicle 110. That is, the airbag sensor 360 detects when an airbag within the vehicle 110 has been deployed and provides this information to the vehicle processing unit 300. When an accident is detected, the vehicle processing unit 300 obtains the state of the airbag(s) within the vehicle 110 from the airbag sensor(s) 360 and transmits this information to the AMH 130.

As discussed above with respect to FIG. 2, the AMH 130 is preferably a remote server, connected wirelessly with the vehicle sudden event detection processing unit 300 of vehicle 110. The AMH 130 includes an Accident Management API 255 that processes inputs from the sensors on the vehicle and reports its results to the ERC server 160 and insurance provider server 170. While it is preferred that AMH 130 be a remote server, it is understood that AMR 130 could be combined with the vehicle sudden event detection processing unit 300 of the vehicle 110. It is also understood that the AMR 130 could be part of or otherwise combined with the ERC server 160 or insurance provider server 170.

Figure 9:
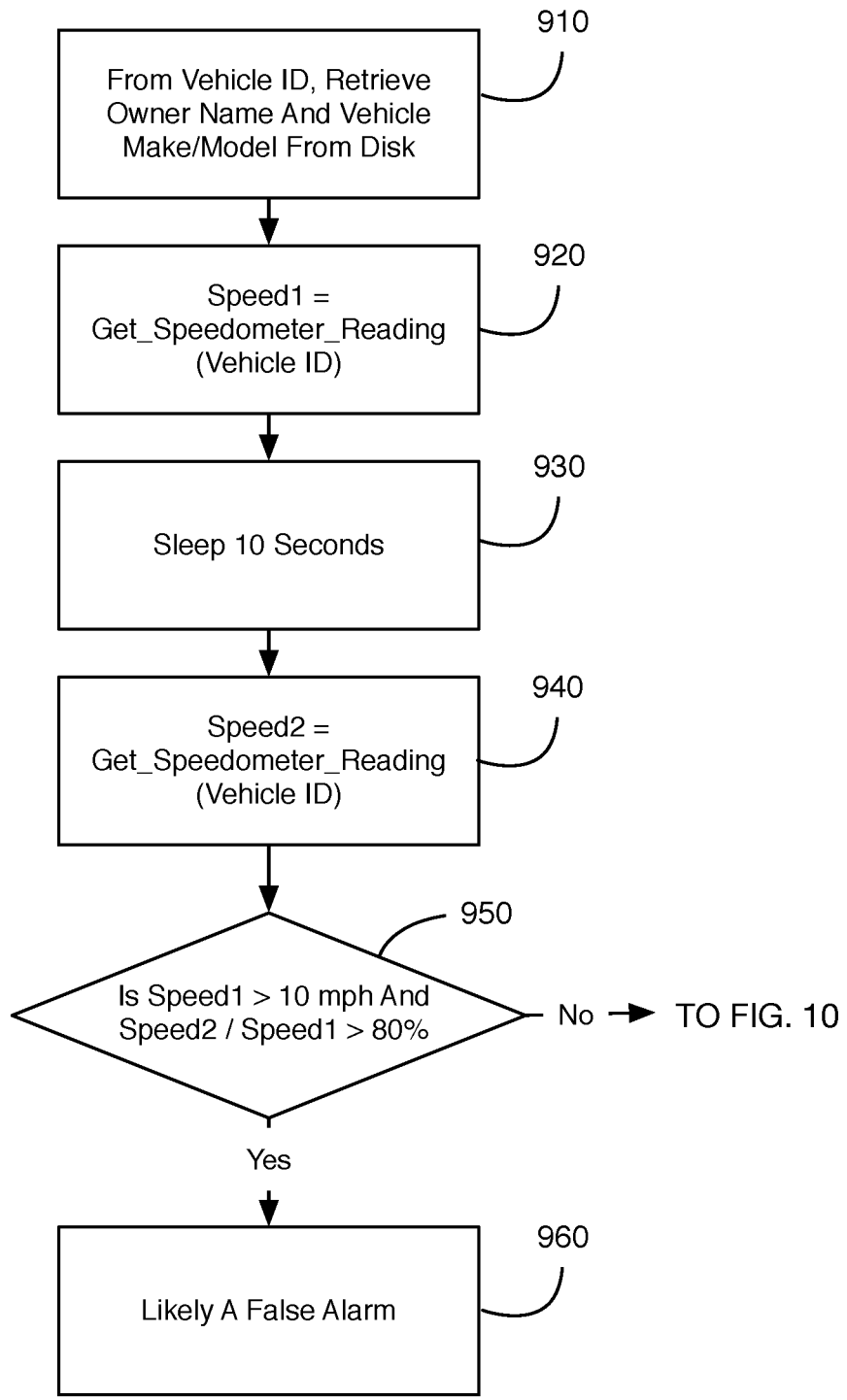
FIG. 9 illustrates a preferred sequence of steps performed when a sudden event is detected by the active accelerometer in the vehicle.
Figure 10:
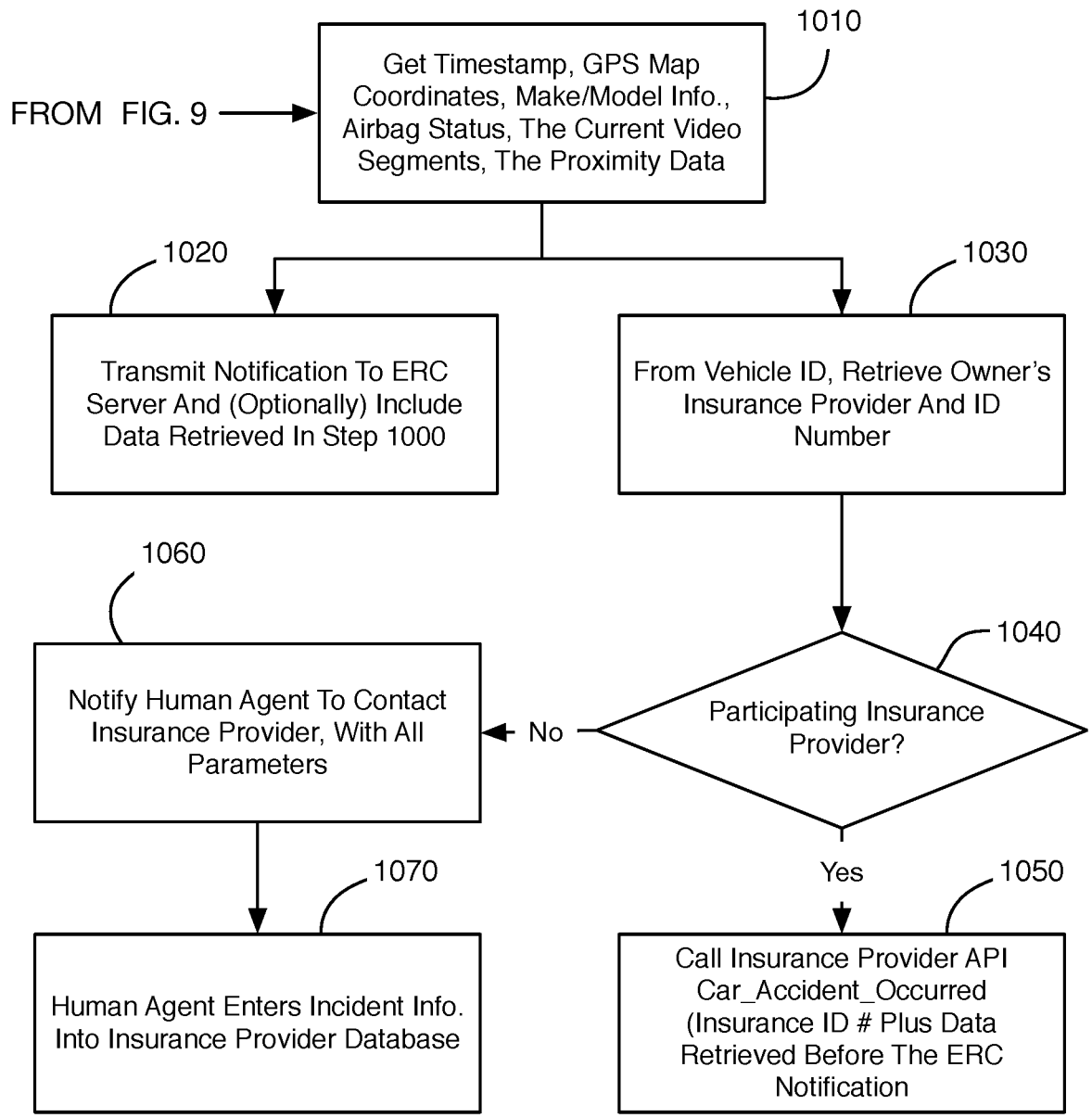
FIG. 10 is a continued preferred sequence of steps from FIG. 9.

FIGS. 9 and 10 illustrate a preferred sequence of steps performed by the vehicle sudden event detection processing unit 300 and AMR 130 when a sudden event is detected by the active accelerometer 340 in the vehicle 110. As discussed above, the accident reporting process is initiated when the accelerometer 340 detects an abrupt acceleration/deceleration that exceeds a pre-defined threshold that is indicative of an auto accident. When this occurs, either the active accelerometer 340 or the vehicle sudden event detection processing unit 300 initiates a remote function call to the Accident Management API 255 of AMH 130, which includes the accelerometer ID and acceleration/deceleration rate.

The Accident Management API 255 causes the AMH processing unit 200 to retrieve the vehicle ID, owner name, and car make/model of the vehicle 110 from database 140 and/or storage 240 (Step 910). To minimize false alarms, either the vehicle sudden event detection processing unit 300 or the AMH processing unit 200 determines whether the vehicle 110 is still moving and at a similar relative velocity within a predefined period (e.g., 10 seconds) after the event (detected accident). As shown in FIG. 9, the vehicle sudden event detection processing unit 300 obtains the velocity (Speed1) of the vehicle 110 from the speedometer sensor 350 at the time of the sudden event (detected accident) (Step 920), waits a predefined period of time (e.g., 10 seconds) (Step 930), and obtains the velocity (Speed2) of the vehicle 110 from the speedometer sensor 350 after expiration of the predetermined period of time (Step 940).

The vehicle sudden event detection processing unit 300 (or the AMH processing unit 200 if the data is transmitted to the AMR 130) compares the Speed1 velocity to the Speed2 velocity to assess the likelihood of a false alarm (Step 950). For example, if the Speed1 velocity is greater than a predefined velocity (e.g., 10 mph) and the quotient of Speed2 divided by Speed 1 is greater than a predefined percentage (e.g., 80%), then this is likely a false alarm and execution ends (Step 960).

If not, then an accident has likely occurred and the accident reporting process continues with Step 1010 in FIG. 10. The vehicle sudden event detection processing unit 300 retrieves map coordinates from the vehicle's GPS transceiver 370, make/model information from memory 310, airbag status from the airbag sensor(s) 360, current video segments stored in memory 310 (in the form of transferrable BLOBs), and data from the proximity sensors 330 (Step 1010). The vehicle processing unit 300 transmits this retrieved information to the AMH processing unit 200, which preferably stores the information in memory 210 or database 140.

The AMH processing unit 200 transmits a notification to the ERC server 160 that vehicle 110 has been involved in an accident (Step 1020). The transmitted accident notification preferably includes the timestamp, GPS Map coordinates, and the make/model information of the vehicle 3110 to allow the ERC server 160 to dispatch police to the scene of the accident and, if needed, fire and ambulance personnel. The notification to the ERC server 160 may optionally include additional data and/or information received by the AMH 130 relating to the accident.

From the vehicle ID, the AMH processing unit 200 also retrieves the vehicle owner's insurance provider and ID number from database 140 or memory 210 (Step 1030). The AMH processing unit 200 determines whether the vehicle owner's insurance provider is a participating insurance provider (Step 1040). If this is a participating insurance provider, the AMH processing unit 200 reports the accident to the participating insurance provider by transmitting the vehicle owner's Insurance ID # and data/information relating to the accident to the insurance provider server 170 (Step 1050). The data/information relating to the accident preferably includes (but is not limited to) GPS coordinates, accelerometer data, video segments from each camera, proximity data, and whether the vehicle airbag(s) was deployed.

If the vehicle owner's insurance provider is not a participating insurance provider in Step 1040, the AMH processing unit 200 transmits a notification to a human agent via, for example, text message or the like, to manually contact the vehicle owner's non-participating insurance provider, with all the data/information described above relating to the accident (Step 1060). A human agent, in turn, enters the incident information into the insurance provider's database (Step 1070).

Figure 11:
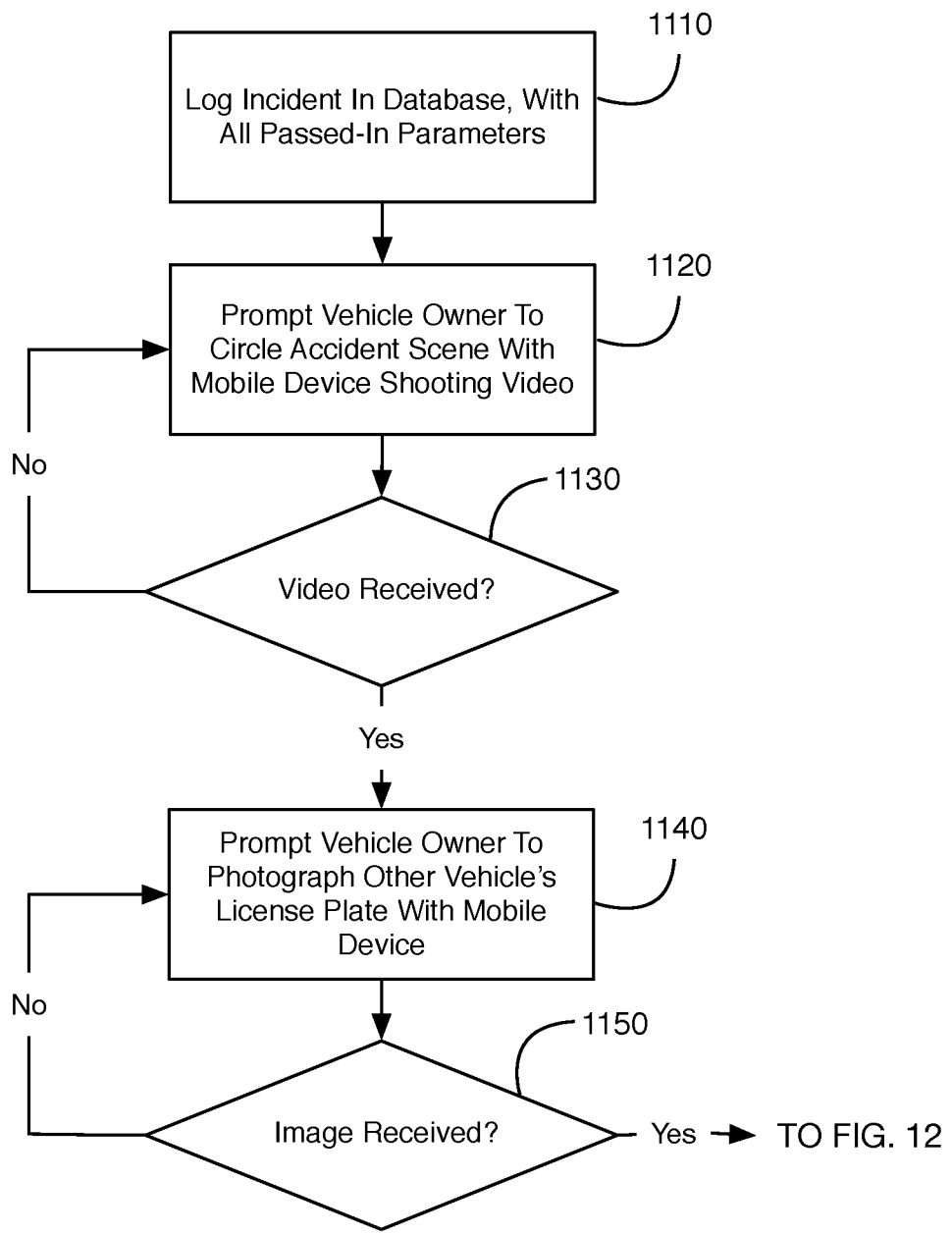
FIG. 11 illustrates a preferred sequence of steps performed by a participating insurance provider server upon receiving notification of an insured's accident from the accident management hub.
Figure 12:
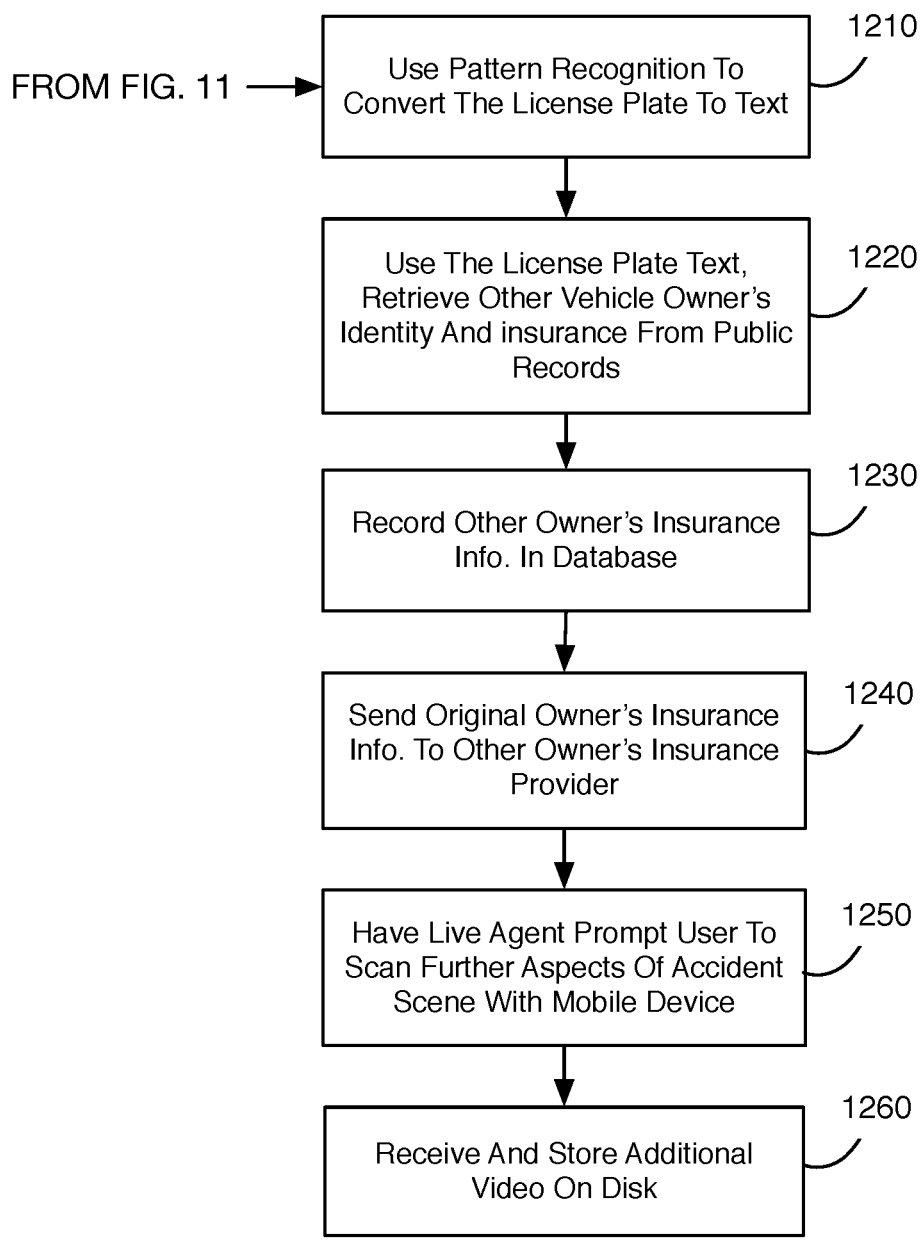
FIG. 12 is a continued preferred sequence of steps from FIG. 11.

Referring to FIGS. 11 and 12, a preferred sequence of steps performed by a participating insurance provider server 170 upon receiving notification of an insured's accident from the AMH 130. It is understood, however, that the preferred sequence of steps described below could also be performed by the AMH 130, with all the information obtained by the AMH 130 relating to the accident being subsequently transmitted to the insurance provider server 170 for storage in database 180.

A software application running on the insurance provider server 170 automatically logs the incident in an insurance provider database 180, including the data/information received from AMH 130 relating to the accident (Step 1110). One or more processors in the insurance provider server 170 transmit a communication over network 120 to a mobile device 150 used by the vehicle owner or operator. As discussed above, the mobile device 150 is preferably a wearable electronic/computing device, such as (but not limited to) wearable electronic/computing devices affixed to eyeglasses and sunglasses (e.g., Google Glass®), helmets, wristwatches, and the like, that are capable of recording/collecting data and communicating with AMH 130 via network 120. Alternatively, the mobile device 150 may be a smart phone (e.g., iPhone® or Android® handheld device); tablet computer (e.g., iPad® or Windows® Surface® tablet computer); personal digital assistant (PDA); or any other electronic device or computing system capable of communicating with AMH 130 via network 120.

The communication from the insurance provider server 170 to the mobile device 150 may, for example, prompt the owner or operator of the vehicle 110 to circle the accident scene while recording video with the mobile device 150 (e.g., Google Glass®) (Step 1120). The mobile device 150 transmits the recorded video to the insurance provider server 170 over network 120 (Step 1130), which is preferably stored in database 180.

In addition, the insurance provider server 170 may also prompt the vehicle owner or operator to photograph the other vehicle's license plate with the mobile device 150 (e.g., Google Glass®) (Step 1140). The mobile device 150 transmits the image of the license plate to the insurance provider server 170 over network 120 (Step 1150). Referring to FIG. 12, software running on the insurance provider server 170 may use pattern recognition to convert the license plate image to text (Step 1210), from which the server 170 may retrieve the other vehicle owner's identity and insurance information from public records (Step 1220). The insurance provider server 170 may then record the owner's insurance information for the other vehicle in database 180 (Step 1230).

The insurance provider server 170 may optionally transmit the original vehicle owner's insurance information to the other owner's insurance provider (Step 1240). In addition, the insurance provider server 170 may optionally notify a live agent to continue working with the original vehicle owner to view/scan further relevant aspects of the accident scene with the mobile device 150 (Step 1250), which can then be transmitted to the insurance provider database 170 for storage in database 180 (Step 1260).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle accident reporting system, comprising:
an accident management hub; and
a sudden event detection processor operatively coupled to non-transient storage and at least one accelerometer in a vehicle, the sudden event detection processor being programmed to:
identify a sudden event when a measured acceleration of the vehicle sensed by the at least one accelerometer exceeds either a predefined maximum acceleration or a predefined maximum deceleration, and
transmit a notification over a network to the accident management hub that a sudden event has occurred;
the accident management hub including at least one processing unit, the at least one processing unit being programmed to:
transmit a prompt to a mobile device associated with an owner or operator of the vehicle, the prompt requesting that the owner or operator photograph a license plate of any other vehicle involved in the accident and record video of the accident scene,
receive from the mobile device the requested image of the license plate and video of the accident scene.

2. The vehicle accident reporting system of claim 1, wherein the sudden event detection processor is further programmed to:
receive video data from at least one video camera in the vehicle;
store in non-transient storage only current video data of a predefined duration received from the at least one video camera, while deleting video data that is older than the difference between a current time and the predefined duration, and
transmit the current video data stored in non-transient storage over the network to the accident management hub when the sudden event was identified.

3. The vehicle accident reporting system of claim 2, wherein the sudden event detection processor is further programmed to:
receive GPS coordinates from a global positioning satellite (GPS) transceiver in the vehicle;
store in non-transient storage GPS data from the GPS transceiver, and transmit the GPS data stored in non-transient storage over the network to the accident management hub when the sudden event was identified.

4. The vehicle accident reporting system of claim 3, wherein the at least one processing unit is further programmed to:
receive vehicle identification data from the sudden event detection processor when the sudden event was identified,
identify, based on the vehicle identification data, an insurance provider associated with the vehicle by retrieving from non-transient storage insurance provider information associated with the vehicle, and
transmit an accident notification to a computer system associated with the identified insurance provider, the accident notification including at least the vehicle identification, current video data and GPS coordinates received from the at least one sudden event detection processor when the sudden event was identified.

5. The vehicle accident reporting system according to claim 4, wherein the at least one processing unit is further programmed to:
transmit a notification to an emergency response center computer system to dispatch emergency response personnel to the location of the accident, the transmitted notification including at least the vehicle identification, current video data and GPS coordinates received from the at least one sudden event detection processor when the sudden event was identified.

6. The vehicle accident reporting system according to claim 1, wherein the sudden event detection processor is programmed to:
receive velocity measurements from a speedometer sensor in the vehicle,
calculate the acceleration of the vehicle based on the received velocity measurements,
compare the calculated acceleration with the measured acceleration of the vehicle sensed by an active accelerometer in the vehicle,
determine that the active accelerometer is functioning improperly if the measured acceleration differs from the calculated acceleration by a predefined maximum threshold; and
upon determining that the active accelerometer is functioning improperly, switch to a backup accelerometer in the vehicle to identify when a sudden event occurs.

7. The vehicle accident reporting system according to claim 1, further comprising at least one proximity sensor on the vehicle operatively coupled to the at least one sudden event detection processor, and
wherein the sudden event detection processor is programmed to:
receive proximity data from at least one least one proximity sensor on the vehicle,
store in non-transient storage only current proximity data of a predefined duration, while deleting proximity data that is older than the difference between a current time and the predefined duration, and
transmit the current proximity data to the accident management hub when a sudden event has been detected.

8. The vehicle accident reporting system according to claim 1, wherein the sudden event detection processor is further programmed to:
obtain a first velocity measurement from a speedometer sensor in the vehicle when a sudden event is identified,
obtain a second velocity measurement from the speedometer sensor at a predefined time after obtaining the first velocity measurement,
compare the first velocity measurement to the second velocity measurement, and
determine that the identified sudden event was not valid when:
the first velocity measurement is greater than a predefined minimum velocity threshold, and
the quotient of the second velocity measurement divided by the first velocity measurement is below a predefined threshold.

9. The vehicle accident reporting system according to claim 4, wherein the at least one processing unit is further programmed to:
convert, using pattern recognition, the received image of the other vehicle license plate to text,
retrieve, using the converted license plate text, an identity of the owner of the other vehicle and an insurance provider associated with the other vehicle, and
transmit a notification to a computer system associated with the insurance provider for the other vehicle, the notification including at least the identified owner of the other vehicle and the identified insurance information associated with the vehicle in which the sudden event was identified by the at least one sudden event detection processor.

10. The vehicle accident reporting system according to claim 7, wherein the sudden event detection processor receives and stores:
video from four cameras located on the vehicle,
proximity data from four proximity sensors located on the vehicle, and
data from at least one airbag sensor indicative of whether an airbag in the vehicle has been deployed.

11. A computer-implemented vehicle accident reporting method, comprising:
identifying, using a sudden event detection processor operatively coupled to non-transient storage and an accelerometer in a vehicle, a sudden event when a measured acceleration of the vehicle sensed by the accelerometer exceeds either a predefined maximum acceleration or a predefined maximum deceleration indicative of an accident;
transmitting, using the sudden event detection processor, a notification over a network to an accident management hub that a sudden event has occurred;
transmitting a prompt over the network to a mobile device associated with an owner or operator of the vehicle, the prompt requesting that the owner or operator photograph a license plate of any other vehicle involved in the accident and record video of the accident scene; and
receiving, from the mobile device, the requested image of the license plate and video of the accident scene.

12. The computer-implemented method according to claim 11, further comprising:
receiving, using the sudden event detection processor, video data from at least one video camera in the vehicle;
storing, in non-transient storage, only current video data of a predefined duration received from the at least one video camera, while deleting video data that is older than the difference between a current time and the predefined duration; and
transmitting, using the sudden event detection processor, the current video data stored in non-transient storage over the network to the accident management hub when the sudden event was identified.

13. The computer-implemented method according to claim 12, further comprising:
   receiving, using the sudden event detection processor, GPS coordinates from a global positioning satellite (GPS) transceiver in the vehicle;
   storing, in non-transient storage, GPS data from the GPS transceiver; and
   transmitting the GPS data stored in non-transient storage over the network to the accident management hub when the sudden event was identified.

14. The computer-implemented method according to claim 13, further comprising:
   receiving vehicle identification data from the sudden event detection processor when the sudden event was identified;
   identifying, based on the vehicle identification transmitted by the sudden event detection processor, an insurance provider associated with the vehicle by retrieving from non-transient storage insurance provider information associated with the vehicle; and
   transmitting an accident notification to a computer system associated with the identified insurance provider, the accident notification including at least the vehicle identification, current video data and GPS coordinates received from the at least one sudden event detection processor when the sudden event was identified.

15. The computer-implemented method according to claim 14, further comprising:
   transmitting a notification to an emergency response center computer system to dispatch emergency response personnel to the location of the accident, the transmitted notification including at least the vehicle identification, current video data and GPS coordinates received from the at least one sudden event detection processor when the sudden event was identified.

16. The computer-implemented method according to claim 12, further comprising:
   receiving, using the sudden event detection processor, velocity measurements from a speedometer sensor in the vehicle;
   calculating, using the sudden event detection processor, an acceleration of the vehicle based on the received velocity measurements;
   comparing, using the sudden event detection processor, the calculated acceleration with an acceleration of the vehicle measured by a first accelerometer in the vehicle;
   determining, using the sudden event detection processor, that the first accelerometer is malfunctioning if the difference between the measured acceleration and calculated acceleration exceeds a predefined maximum threshold; and
   upon determining that the first accelerometer is malfunctioning, switching to a second accelerometer in the vehicle to identify when a sudden event occurs.

17. The computer-implemented method according to claim 12, further comprising:
   receiving, using sudden event detection processor operatively coupled to at least one proximity sensor on the vehicle, proximity data from the at least one proximity sensor;
   storing, in non-transient storage using the at least one sudden event detection processor, only current proximity data of a predefined duration, while deleting proximity data that is older than the difference between a current time and the predefined duration; and
   transmitting, using the at least one sudden event detection processor, the current proximity data to the accident management hub when a sudden event has been detected.

18. The computer-implemented method according to claim 11, further comprising:
   obtaining, using a speedometer sensor operationally coupled to the sudden event detection processor, a first velocity measurement of the vehicle when a sudden event is identified;
   obtaining, using the speedometer sensor operationally coupled to the sudden event detection processor, a second velocity measurement at a predefined time after obtaining the first velocity measurement;
   comparing, using the sudden event detection processor, the first velocity measurement to the second velocity measurement; and
   determining that the identified sudden event was not valid when:
      the first velocity measurement is greater than a predefined minimum velocity threshold, and
      the quotient of the second velocity measurement divided by the first velocity measurement is below a predefined threshold.

19. The computer-implemented method according to claim 11, further comprising:
   converting, using pattern recognition, the received image of the other vehicle license plate to text;
   retrieving, using the converted license plate text, an identity of the owner of the other vehicle and an insurance provider associated with the other vehicle; and
   transmitting, using the sudden event detection processor, a notification to a computer system associated with the insurance provider for the other vehicle, the notification including at least the identified owner of the other vehicle and the identified insurance information associated with the vehicle in which the sudden event was identified by the sudden event detection processor.

20. The computer-implemented method according to claim 17, further comprising:
   receiving and storing, using the sudden event detection processor, video from four cameras located on the vehicle;
   receiving and storing, using the sudden event detection processor, proximity data from four proximity sensors located on the vehicle; and
   receiving and storing, using the sudden event detection processor, data from at least one airbag sensor indicative of whether an airbag in the vehicle has been deployed.

* * * * *